(12) United States Patent
Ferris et al.

(10) Patent No.: US 9,484,733 B1
(45) Date of Patent: Nov. 1, 2016

(54) POWER CONTROL MODULE FOR DATA STORAGE DEVICE

(71) Applicant: Western Digital Technologies, Inc., Irvine, CA (US)

(72) Inventors: Timothy A. Ferris, Mission Viejo, CA (US); John R. Agness, Laguna Hills, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 316 days.

(21) Appl. No.: 14/146,555

(22) Filed: Jan. 2, 2014

Related U.S. Application Data

(60) Provisional application No. 61/876,682, filed on Sep. 11, 2013.

(51) Int. Cl.
*H02H 3/087* (2006.01)
*H02H 3/20* (2006.01)
*H02H 5/04* (2006.01)

(52) U.S. Cl.
CPC ............. *H02H 3/087* (2013.01); *H02H 3/202* (2013.01); *H02H 5/04* (2013.01)

(58) Field of Classification Search
CPC combination set(s) only.
See application file for complete search history.

(56) References Cited

U.S. PATENT DOCUMENTS

| 4,924,343 A * | 5/1990 | Niemi | H03K 17/785 323/277 |
| 5,949,633 A * | 9/1999 | Conway | H02H 7/04 361/36 |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,094,362 A | 7/2000 | Domingo | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |

(Continued)

*Primary Examiner* — Thienvu Tran
*Assistant Examiner* — Angela Brooks

(57) ABSTRACT

A power control module including first port for receiving supply voltage from host power supply, second port for providing output voltage to power one or more data storage device components, isolation circuit coupled to first and second ports, driver including output coupled to control terminal of isolation circuit, voltage booster including input for receiving supply voltage and output for providing boost voltage to supply terminal of driver, voltage limiter operable to limit boost voltage to a limited boost voltage, and control circuitry coupled to drive input and operable to cause the isolation circuit to be in closed state during normal operating mode by causing the driver to apply limited boost voltage to the control terminal of the isolation circuit, thereby enabling the isolation circuit to provide over-voltage protection to one or more data storage device components by limiting output voltage at second port to less than the limited boost voltage.

36 Claims, 5 Drawing Sheets

(56) References Cited

U.S. PATENT DOCUMENTS

| | | |
|---|---|---|
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,901,520 B2 | 5/2005 | Odaohhara et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |

(56) References Cited

U.S. PATENT DOCUMENTS

| | | | |
|---|---|---|---|
| 7,468,855 B1 | 12/2008 | Weerasooriya et al. | |
| 7,477,471 B1 | 1/2009 | Nemshick et al. | |
| 7,480,116 B1 | 1/2009 | Bennett | |
| 7,489,464 B1 | 2/2009 | McNab et al. | |
| 7,492,546 B1 | 2/2009 | Miyamura | |
| 7,495,857 B1 | 2/2009 | Bennett | |
| 7,499,236 B1 | 3/2009 | Lee et al. | |
| 7,502,192 B1 | 3/2009 | Wang et al. | |
| 7,502,195 B1 | 3/2009 | Wu et al. | |
| 7,502,197 B1 | 3/2009 | Chue | |
| 7,505,223 B1 | 3/2009 | McCornack | |
| 7,542,225 B1 | 6/2009 | Ding et al. | |
| 7,548,392 B1 | 6/2009 | Desai et al. | |
| 7,551,390 B1 | 6/2009 | Wang et al. | |
| 7,558,016 B1 | 7/2009 | Le et al. | |
| 7,573,670 B1 | 8/2009 | Ryan et al. | |
| 7,576,941 B1 | 8/2009 | Chen et al. | |
| 7,580,212 B1 | 8/2009 | Li et al. | |
| 7,583,470 B1 | 9/2009 | Chen et al. | |
| 7,595,954 B1 | 9/2009 | Chen et al. | |
| 7,602,575 B1 | 10/2009 | Lifchits et al. | |
| 7,616,399 B1 | 11/2009 | Chen et al. | |
| 7,619,844 B1 | 11/2009 | Bennett | |
| 7,626,782 B1 | 12/2009 | Yu et al. | |
| 7,630,162 B2 | 12/2009 | Zhao et al. | |
| 7,639,447 B1 | 12/2009 | Yu et al. | |
| 7,656,604 B1 | 2/2010 | Liang et al. | |
| 7,656,607 B1 | 2/2010 | Bennett | |
| 7,660,067 B1 | 2/2010 | Ji et al. | |
| 7,663,835 B1 | 2/2010 | Yu et al. | |
| 7,675,707 B1 | 3/2010 | Liu et al. | |
| 7,679,854 B1 | 3/2010 | Narayana et al. | |
| 7,688,534 B1 | 3/2010 | McCornack | |
| 7,688,538 B1 | 3/2010 | Chen et al. | |
| 7,688,539 B1 | 3/2010 | Bryant et al. | |
| 7,697,233 B1 | 4/2010 | Bennett et al. | |
| 7,701,156 B2 * | 4/2010 | Okamura | B60K 6/365 180/65.265 |
| 7,701,661 B1 | 4/2010 | Bennett | |
| 7,710,676 B1 | 5/2010 | Chue | |
| 7,715,138 B1 | 5/2010 | Kupferman | |
| 7,729,079 B1 | 6/2010 | Huber | |
| 7,733,189 B1 | 6/2010 | Bennett | |
| 7,746,592 B1 | 6/2010 | Liang et al. | |
| 7,746,594 B1 | 6/2010 | Guo et al. | |
| 7,746,595 B1 | 6/2010 | Guo et al. | |
| 7,760,461 B1 | 7/2010 | Bennett | |
| 7,768,758 B2 * | 8/2010 | Maier | H03K 17/08148 335/18 |
| 7,800,853 B1 | 9/2010 | Guo et al. | |
| 7,800,856 B1 | 9/2010 | Bennett et al. | |
| 7,800,857 B1 | 9/2010 | Calaway et al. | |
| 7,839,591 B1 | 11/2010 | Weerasooriya et al. | |
| 7,839,595 B1 | 11/2010 | Chue et al. | |
| 7,839,600 B1 | 11/2010 | Babinski et al. | |
| 7,843,662 B1 | 11/2010 | Weerasooriya et al. | |
| 7,852,588 B1 | 12/2010 | Ferris et al. | |
| 7,852,592 B1 | 12/2010 | Liang et al. | |
| 7,864,481 B1 | 1/2011 | Kon et al. | |
| 7,864,482 B1 | 1/2011 | Babinski et al. | |
| 7,869,155 B1 | 1/2011 | Wong | |
| 7,876,522 B1 | 1/2011 | Calaway et al. | |
| 7,876,523 B1 | 1/2011 | Panyavoravaj et al. | |
| 7,916,415 B1 | 3/2011 | Chue | |
| 7,916,416 B1 | 3/2011 | Guo et al. | |
| 7,916,420 B1 | 3/2011 | McFadyen et al. | |
| 7,916,422 B1 | 3/2011 | Guo et al. | |
| 7,929,238 B1 | 4/2011 | Vasquez | |
| 7,961,422 B1 | 6/2011 | Chen et al. | |
| 8,000,053 B1 | 8/2011 | Anderson | |
| 8,031,423 B1 | 10/2011 | Tsai et al. | |
| 8,054,022 B1 | 11/2011 | Ryan et al. | |
| 8,059,357 B1 | 11/2011 | Knigge et al. | |
| 8,059,360 B1 | 11/2011 | Melkote et al. | |
| 8,072,703 B1 | 12/2011 | Calaway et al. | |
| 8,077,428 B1 | 12/2011 | Chen et al. | |
| 8,078,901 B1 | 12/2011 | Meyer et al. | |
| 8,081,395 B1 | 12/2011 | Ferris | |
| 8,085,020 B1 | 12/2011 | Bennett | |
| 8,116,023 B1 | 2/2012 | Kupferman | |
| 8,145,934 B1 | 3/2012 | Ferris et al. | |
| 8,179,626 B1 | 5/2012 | Ryan et al. | |
| 8,189,286 B1 | 5/2012 | Chen et al. | |
| 8,213,106 B1 | 7/2012 | Guo et al. | |
| 8,254,222 B1 | 8/2012 | Tang | |
| 8,300,348 B1 | 10/2012 | Liu et al. | |
| 8,315,005 B1 | 11/2012 | Zou et al. | |
| 8,320,069 B1 | 11/2012 | Knigge et al. | |
| 8,351,174 B1 | 1/2013 | Gardner et al. | |
| 8,358,114 B1 | 1/2013 | Ferris et al. | |
| 8,358,145 B1 | 1/2013 | Ferris et al. | |
| 8,373,372 B2 * | 2/2013 | Su | H02P 5/74 318/400.01 |
| 8,390,367 B1 | 3/2013 | Bennett | |
| 8,432,031 B1 | 4/2013 | Agness et al. | |
| 8,432,629 B1 | 4/2013 | Rigney et al. | |
| 8,451,697 B1 | 5/2013 | Rigney et al. | |
| 8,472,157 B2 | 6/2013 | Yin et al. | |
| 8,482,873 B1 | 7/2013 | Chue et al. | |
| 8,498,076 B1 | 7/2013 | Sheh et al. | |
| 8,498,172 B1 | 7/2013 | Patton, III et al. | |
| 8,502,420 B1 * | 8/2013 | Mogilevski | H02M 3/33592 307/151 |
| 8,508,881 B1 | 8/2013 | Babinski et al. | |
| 8,531,798 B1 | 9/2013 | Xi et al. | |
| 8,537,486 B2 | 9/2013 | Liang et al. | |
| 8,542,455 B2 | 9/2013 | Huang et al. | |
| 8,553,351 B1 | 10/2013 | Narayana et al. | |
| 8,564,899 B2 | 10/2013 | Lou et al. | |
| 8,576,506 B1 | 11/2013 | Wang et al. | |
| 8,605,382 B1 | 12/2013 | Mallary et al. | |
| 8,605,384 B1 | 12/2013 | Liu et al. | |
| 8,610,391 B1 | 12/2013 | Yang et al. | |
| 8,611,040 B1 | 12/2013 | Xi et al. | |
| 8,619,385 B1 | 12/2013 | Guo et al. | |
| 8,630,054 B2 | 1/2014 | Bennett et al. | |
| 8,630,059 B1 | 1/2014 | Chen et al. | |
| 8,634,154 B1 | 1/2014 | Rigney et al. | |
| 8,634,283 B1 | 1/2014 | Rigney et al. | |
| 8,643,976 B1 | 2/2014 | Wang et al. | |
| 8,649,121 B1 | 2/2014 | Smith et al. | |
| 8,654,466 B1 | 2/2014 | McFadyen | |
| 8,654,467 B1 | 2/2014 | Wong et al. | |
| 8,665,546 B1 | 3/2014 | Zhao et al. | |
| 8,665,551 B1 | 3/2014 | Rigney et al. | |
| 8,670,206 B1 | 3/2014 | Liang et al. | |
| 8,687,312 B1 | 4/2014 | Liang | |
| 8,693,123 B1 | 4/2014 | Guo et al. | |
| 8,693,134 B1 | 4/2014 | Xi et al. | |
| 8,699,173 B1 | 4/2014 | Kang et al. | |
| 8,711,027 B1 | 4/2014 | Bennett | |
| 8,717,696 B1 | 5/2014 | Ryan et al. | |
| 8,717,699 B1 | 5/2014 | Ferris | |
| 8,717,704 B1 | 5/2014 | Yu et al. | |
| 8,724,245 B1 | 5/2014 | Smith et al. | |
| 8,724,253 B1 | 5/2014 | Liang et al. | |
| 8,724,524 B2 | 5/2014 | Urabe et al. | |
| 8,737,008 B1 | 5/2014 | Watanabe et al. | |
| 8,737,013 B2 | 5/2014 | Zhou et al. | |
| 8,743,495 B1 | 6/2014 | Chen et al. | |
| 8,743,503 B1 | 6/2014 | Tang et al. | |
| 8,743,504 B1 | 6/2014 | Bryant et al. | |
| 8,749,904 B1 | 6/2014 | Liang et al. | |
| 8,760,796 B1 | 6/2014 | Lou et al. | |
| 8,767,332 B1 | 7/2014 | Chahwan et al. | |
| 8,767,343 B1 | 7/2014 | Helmick et al. | |
| 8,767,354 B1 * | 7/2014 | Ferris | G11B 5/40 360/272 |
| 8,773,787 B1 | 7/2014 | Beker | |
| 8,779,574 B1 | 7/2014 | Agness et al. | |
| 8,780,473 B1 | 7/2014 | Zhao et al. | |
| 8,780,477 B1 | 7/2014 | Guo et al. | |
| 8,780,479 B1 | 7/2014 | Helmick et al. | |
| 8,780,489 B1 | 7/2014 | Gayaka et al. | |

(56) References Cited

U.S. PATENT DOCUMENTS

| | | |
|---|---|---|
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 9,118,260 B2 * | 8/2015 | Gautier ................ H02P 27/085 |
| 9,251,839 B1 | 2/2016 | Agness et al. |
| 2003/0111972 A1 * | 6/2003 | Strothmann ............ B60L 11/00 318/268 |
| 2004/0095815 A1 | 5/2004 | Chloupek et al. |
| 2009/0153236 A1 * | 6/2009 | Kneepkens ............... G06F 1/26 327/544 |
| 2010/0035085 A1 | 2/2010 | Jung et al. |
| 2010/0328849 A1 * | 12/2010 | Ewing .................... G06F 1/266 361/622 |
| 2011/0188146 A1 | 8/2011 | Oh et al. |
| 2012/0194953 A1 | 8/2012 | Mikolajczak |
| 2012/0200967 A1 | 8/2012 | Mikolajczak |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2013/0320875 A1 * | 12/2013 | Saes ................... H05B 33/0818 315/224 |

\* cited by examiner

POWER CONTROL MODULE FOR DATA STORAGE DEVICE

CROSS REFERENCE TO RELATED APPLICATION

This application claims priority to U.S. Application No. 61/876,682, filed Sep. 11, 2013, for "POWER CONTROL MODULE FOR DATA STORAGE DEVICE", which is incorporated herein by reference.

BACKGROUND

Date storage devices, such as disk drives, hybrid drives, and solid state drives, may receive power from a host power supply, which can reside in a desktop or laptop computer or be a standalone power supply, for example. The host power supply typically receives its power from an AC power line. However, if voltage transients occur on the AC power line and the host power supply is not well designed, the data storage device to which it is connected may be subjected to an over-voltage condition, which may cause damage to the device and/or corruption of data stored therein. Also, a data storage device may share a host power supply with one or more other products. As a result, a load transient may cause the supply voltage from the host power supply to go out of regulation, thereby causing an undesirable over-voltage condition.

In addition to over-voltage conditions, a short-to-ground condition resulting from, for example, a defective component in the data storage device can cause an over-temperature or over-current condition, which can cause damage to one or more components in the data storage device. Thus, it is desirable to provide over-voltage, over-current, and over-temperature protection in a data storage device.

DETAILED DESCRIPTION

Some embodiments of the present disclosure are directed to power control modules for providing protection against one or more of over-voltage, over-current, and over-temperature conditions in data storage devices (e.g., disk drives, hybrid drives comprising rotating magnetic media and non-volatile semiconductor memory, or solid state drives). In various embodiments, one or more isolation circuits are situated in a current path that extends from a host input voltage port to an output voltage port in a power control module to provide over-voltage and over-current protection to components of a data storage device in which the power control module resides. In various embodiments, the one or more isolation circuits in the power control module are protected from an over-temperature condition.

While various embodiments are described herein, these embodiments are presented by way of example only, and not intended to limit the scope of protection. Indeed, the novel methods and devices described herein may be embodied in a variety of other forms. Furthermore, various omissions, substitutions and changes in the form of the methods and devices described herein may be made without departing from the scope of protection. To illustrate some of the embodiments, reference will now be made to the figures.

Figure 1:
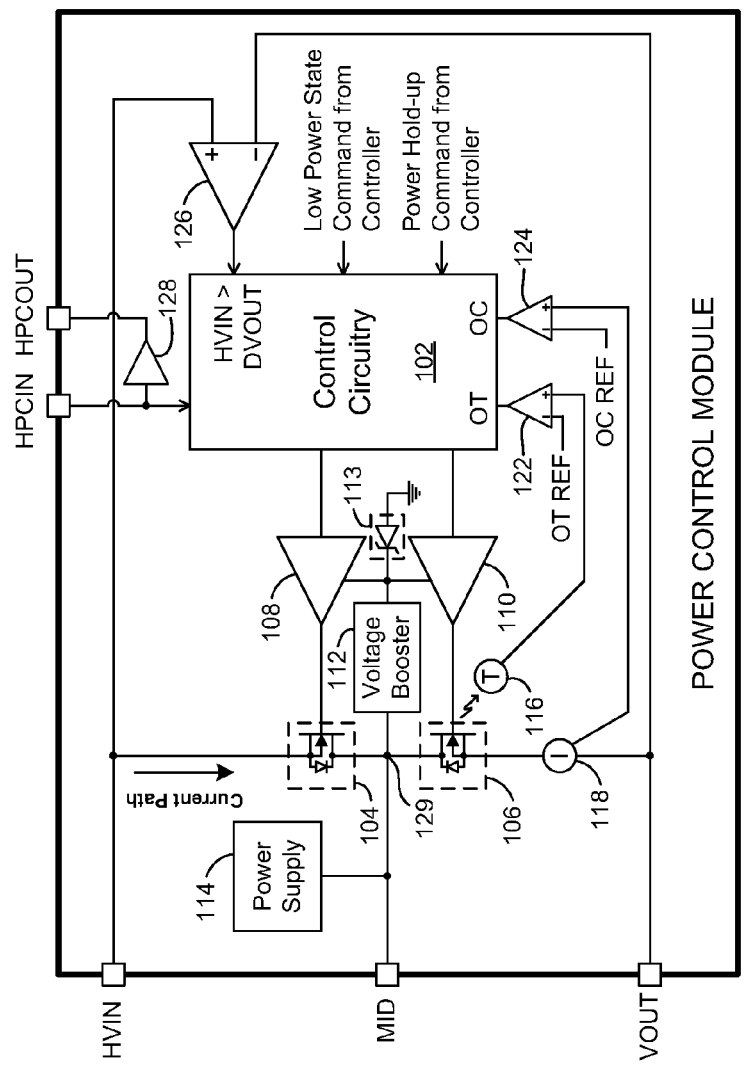
FIG. 1 shows a power control module for a data storage device according to an embodiment of the invention comprising two isolation circuits which are coupled between a host input voltage port and an output voltage port of the power control module.

FIG. 1 shows a power control module 100 according to an embodiment of the invention. As shown in FIG. 1, the power control module 100 includes a host supply voltage input (HVIN) port for receiving a supply voltage from a host power supply (which may reside in a computing device such as a desktop, laptop or tablet computer or be a standalone power supply) and an output voltage (VOUT) port for providing power to components (e.g., a controller and non-volatile memory (NVM)) of a data storage device (e.g., a disk drive, hybrid drive, or solid state drive) via a power system in the data storage device in which the power control module also resides. In one embodiment, HVIN may be approximately 5V. In other embodiments, HVIN may be less than or greater than 5V, such as approximately 12V. In the embodiment shown in FIG. 1, the power control module 100 also includes a host power control input (HPCIN) port for receiving a power control signal from the host, and a host power control output (HPCOUT) port for providing the host power control signal to a controller (not shown in FIG. 1) in the data storage device.

As shown in FIG. 1, the power control module 100 also includes isolation circuits 104 and 106, drivers 108 and 110, a voltage booster 112, a voltage limiter 113, a power supply 114, a temperature sensor 116, a current sensor 118, comparators 122, 124, and 126, buffer 128, and an MID port. In one embodiment, all of the components that power control module 100 comprises reside on the same integrated circuit (IC). In one embodiment, the power control module 100 resides in a power system (e.g., a Power Large Scale Integration (PLSI) or a power Application Specific Integrated Circuit (ASIC)), wherein the power control module 100 provides power via the VOUT port to components (e.g., a controller and NVM, such as rotating magnetic media and/or non-volatile semiconductor memory (NVSM) (e.g., flash memory)) in a data storage device via one or more regulators in the power system.

In the embodiment shown in FIG. 1, isolation circuits 104 and 106 each comprise a FET which includes an intrinsic body diode (as shown in FIG. 1). In other embodiments, isolation circuits 104 and 106 may each comprise, for example, a load switch or other type of semiconductor device or devices configured to operate as a switch. In some embodiments, isolation circuits 104 and 106 are situated external to an IC on which other components (e.g., the power supply 114, the voltage booster 112, drivers 108 and 110, and the control circuitry 102) of power control module 100 reside. In some embodiments, only isolation circuit 106 is used.

The temperature sensor 116 can comprise, for example, a bipolar transistor junction and the current sensor 118 can comprise a sense FET or a sense resistor, for example. In some embodiments, the temperature sensor 116 is not used. In the embodiment shown in FIG. 1, the control circuitry 102 can comprise, for example, a state machine for controlling the operation of isolation circuits 104 and 106 via respective drivers 108 and 110. In other embodiments, the control circuitry 102 may comprise, for example, a microprocessor or combinatory logic to control the operation of isolation circuits 104 and 106.

As shown in FIG. 1, isolation circuit 104 is coupled between the HVIN port and node 129, isolation circuit 106 is coupled between node 129 and the VOUT port, the input of the power supply 114, the input of the voltage booster 112, and the MID port are coupled to node 129, the output of the voltage booster 112 is coupled to the voltage input of each of drivers 108 and 110 and one terminal of the voltage limiter 113, and the other terminal of the voltage limiter is coupled to ground. In the embodiment shown in FIG. 1, the voltage limiter 113 comprises a zener diode. In another embodiment, the voltage limiter 113 may comprise one or more components other than a zener diode for limiting the voltage at the output of the voltage booster 112. The output of the power supply 114 provides power to components (e.g., drivers 108 and 110, the control circuitry 102, etc.) of the power control module 100.

As shown in the embodiment in FIG. 1, the input of the voltage booster 112 is coupled to the HVIN port via isolation circuit 104 and is configured to boost the voltage at node 129 to a predetermined boost voltage. The boost voltage is limited by voltage limiter 113 to a limited boost voltage, and the limited boost voltage is coupled to the supply terminals of drivers 108 and 110. The voltage booster 112 may comprise, for example, a charge pump or a boost regulator. In an embodiment in which the supply voltage at the HVIN port is approximately 5V, the limited boost voltage may be, for example, approximately 8.2V.

In the embodiment shown in FIG. 1, node 129 provides a voltage source for the MID port, the power supply 114, and the voltage booster 112, and is supplied by the supply voltage provided by the host at the HVIN port in a normal operating mode. In one embodiment, node 129 can be supplied by a back-up supply voltage provided at the VOUT port in a hold-up mode. In an embodiment in which the hold-up mode is used, it can be triggered when a host supply failure occurs. During the hold-up mode hold-up circuitry in the data storage device is enabled to provide a back-up supply voltage (provided, for example, from a back-up capacitor bank or other back-up charge storage device) at the VOUT port. For example, during the hold-up mode the host power supply may be isolated from the data storage device via the power control module 100 in response to a power hold-up command from a controller (in, for example, a System On a Chip (SOC)) in the data storage device to enable the controller to finish any on-going writing of data to non-volatile memory (e.g., rotating magnetic memory or NVSM) to prevent data loss.

In an embodiment, when node 129 is receiving host supply power via the HVIN port during the normal operating mode, isolation circuits 104 and 106 are turned on by the control circuitry 102. In an embodiment in which the hold-up mode is used, when node 129 is receiving power via the VOUT port in the hold-up mode, isolation circuit 106 is turned on (i.e., set to a closed state) and isolation circuit 104 is turned off (i.e., set to an open state) by the control circuitry 102. In an embodiment in which the isolation circuits 104 and 106 each comprise a FET (as shown in FIG. 1) and the hold-up mode is used, even in the case where each isolation circuit 104 and 106 is turned off (i.e., set to an open state), the intrinsic body diodes in the FETs enable node 129 to be powered from the higher of the host supply voltage at the HVIN port (in the normal operating mode) or the voltage at the VOUT port (in the hold-up mode).

In the embodiment shown in FIG. 1, the temperature sensor 116 is situated sufficiently close to isolation circuit 106 so as to enable it to receive thermal energy from the isolation circuit (e.g., a FET). In the embodiment shown in FIG. 1, a temperature sensor signal provided by the temperature sensor 116 is coupled to the positive input of comparator 122, an over-temperature reference (OT REF) (e.g., an OT reference voltage) is coupled to the negative input of the temperature sensor, and the output of comparator 122 is coupled to the OT input of the control circuitry 102. In an embodiment, comparator 122 is configured to compare the temperature sensor signal outputted by the temperature sensor 116 to the OT reference and to provide an indication of an OT condition to the control circuitry 102 when the temperature sensor signal exceeds the OT reference.

As shown in FIG. 1, the current sensor 118 is coupled between isolation circuit 106 and the VOUT port and situated in a current path extending from the HVIN port to the VOUT port, the output of the current sensor 118 is coupled to the positive input of comparator 124, an over-current reference (OC REF) (e.g., an OC reference voltage) is coupled to the negative input of comparator 124, and the output of comparator 124 is coupled to the OC input of the control circuitry 102. Comparator 124 is configured to compare a current sensor signal outputted by the current sensor 118 to the OC reference and to provide an indication of an OC condition to the control circuitry 102 when the current sensor signal exceeds the OC reference.

In the embodiment shown in FIG. 1, the negative input of comparator 126 is coupled to the VOUT port, the positive input of comparator 126 is coupled to the HVIN port, and the output of comparator 126 is coupled to an input of the control circuitry 102. Comparator 126 is configured to compare the host supply voltage at the HVIN port to the voltage at the VOUT port, and to indicate to the control circuitry 102 whether the host supply voltage at the HVIN port is greater than the voltage at the VOUT port. In an embodiment, when the voltage at the VOUT port is greater than the host supply voltage at the HVIN port, the control circuitry 102 is configured to set isolation circuit 104 to the open state (i.e., turned off) to prevent current flow back to the host power supply. In the embodiment shown in FIG. 1, a power control signal from the host is provided to the control circuitry 102 at the HPCIN port, and the host power control signal is outputted to a controller (not shown in FIG. 1) in the data storage device via the buffer 128 at the HPCOUT port. In an embodiment in which the data storage device comprises a Serial Attached SCSI (SAS) device (e.g., a SAS disk drive), the host power control signal can be a host suspend signal (low power mode signal) that is asserted by the host at the HPCIN port. In an embodiment in which the data storage device comprises a SATA device (e.g., a SATA disk drive), the host power control signal can be a device sleep (DEVSLP) signal (low power mode signal) that is asserted by the host at the HPCIN port. After assertion of the low power mode signal (e.g., a host suspend signal or DEVSLP signal) at the HPCIN port, the low power mode signal is outputted to the controller (e.g., in an SOC in the data storage device) via the HPCOUT port to notify it (the controller) that the host wants the data storage device to enter a low power mode. In an embodiment, after receiving the low power mode signal, the controller is configured to perform one or more housekeeping operations (e.g., sending host commands in a buffer over to non-volatile semiconductor storage (e.g., flash memory), finishing writing data to rotating magnetic media, etc.).

In an embodiment, after completion of the housekeeping operations, the controller is further configured to send a low power state command to the control circuitry 102 to enter a host-requested low power state. When the low power state command is received, the control circuitry 102 is configured to turn off isolation circuit 106, thereby isolating components of the data storage device from host supplied power provided at the VOUT port. In an embodiment, when the host wants the data storage device to come out of the low power state, the host will de-assert the low power mode signal (e.g., the host suspend signal or the DEVSLP signal) at the HPCIN port, and the control circuitry 102 will turn on (i.e., set to a closed state) isolation circuit 106 (and isolation circuit 104 if it was previously turned off) in response to the host's de-assertion action.

In the embodiment shown in FIG. 1, isolation circuits 104 and 106 allow full isolation between the HVIN port (which is coupled to a host power supply) and the VOUT port (which is coupled to one or more components of the data storage device). In an embodiment, when the data storage device is in a cold state (i.e., when the host supply voltage at the HVIN port and the output voltage at the VOUT port equal substantially 0V), isolation circuits 104 and 106 are turned off (i.e., set to an open state). In the normal operating mode of the data storage device, the control circuitry 102 is configured to turn on (i.e. close) isolation circuits 104 and 106 via respective drivers 108 and 110, thereby allowing current to flow in the current path that extends from the HVIN port to the VOUT port and provide an output voltage for powering the components of the data storage device that are external to the power control module 100.

In an embodiment in which the hold-up mode is used, the control circuitry 102 is configured to cause isolation circuit 106 to be in a closed state (i.e., turned on) and isolation circuit 104 to be in an open state (i.e., turned off) in response to a hold-up command received from the controller in the data storage device. As a result, the host power supply is isolated from components of the data storage device that are coupled to (i.e., receive power from) the VOUT port, thereby enabling a back-up voltage to be provided at the VOUT port in response to a host supply voltage failure.

In the embodiment shown in FIG. 1, during the normal operating mode, the control circuitry 102 causes the isolation circuits 104 and 106 to be in closed states (i.e., turned on) by turning on respective drivers 108 and 110, thereby causing the limited boost voltage at the supply terminals of the drivers to be applied to the control terminals of the isolation circuits 104 and 106. When isolation circuit 106 is turned on, it is enabled to provide over-voltage protection to the components of the data storage device (e.g., the controller and NVM) that are coupled to (and receiving power from) the VOUT port by limiting the output voltage at the VOUT port to less than the limited boost voltage.

In one embodiment, two voltage limiters are used in place of voltage limiter 113, wherein the first voltage limiter is coupled between the output of driver 108 and ground and the second voltage limiter is coupled between the output of driver 110 and ground. In the embodiment in which the two voltage limiters are used, the boost voltage is applied to the supply terminals of drivers 108 and 110 and limited to the limited boost voltage at the respective outputs of the drivers 108 and 110 by the voltage limiters when the drivers are turned on by the control circuitry 102. In the embodiment in which the two voltage limiters are used, the control circuitry 102 causes the isolation circuits 104 and 106 to be in closed states (i.e., turned on) by turning on drivers 108 and 110, thereby causing the limited boost voltage at the outputs of the drivers 108 and 110 to be applied to the control terminals of the isolation circuits 104 and 106, respectively.

In an embodiment in which the isolation circuits 104 and 106 each comprise a FET, the source of FET 106 is coupled to the VOUT port, the drain of FET 106 is coupled to node 129, and the gate of FET 106 is coupled to the output of driver 110. When the supply voltage (e.g., 5V) from the host power supply is applied to the HVIN port, the voltage booster 112 (e.g., a charge pump) begins to increase the boost voltage at the supply terminals of the drivers 108 and 110, and the control circuitry 102 turns on the drivers 108 and 110. The voltage booster 112 is configured to take a predetermined amount of time (e.g., approximately 2 milliseconds) to ramp up so as to limit the host power supply inrush current to less than a predetermined amount (e.g., approximately 0.5 amperes). After the FET Vgs threshold is reached at the supply terminals of the drivers 108 and 110, the FETs start conducting (i.e., turn on) and the output voltage at the VOUT port starts to increase. The voltage limiter 113 prevents the boost voltage at the supply terminals of the drivers 108 and 110 from rising higher than the limited boost voltage. In an embodiment in which two voltage limiters are used in place of voltage limiter 113 as described above, the respective voltage limiters prevent the boost voltage at the outputs of the drivers 108 and 110 from rising higher than the limited boost voltage.

In the above embodiment in which isolation circuits 104 and 106 each comprise a FET, if the host supply voltage at the HVIN port begins to increase beyond its normal operating level, basic FET operation prevents the voltage at the source of FET 106 (and, consequently, the output voltage at the VOUT port which is coupled to the source of FET 106) from rising to a higher level than its gate voltage (i.e., the limited boost voltage) minus its Vgs threshold by transitioning to an open state (i.e., turning off). Thus, by preventing the output voltage at the VOUT port from rising to a higher level than the limited boost voltage minus its Vgs threshold, FET 106 provides over-voltage protection to components of the data storage device which are coupled to (and receive power from) the VOUT port.

In the embodiment shown in FIG. 1, over-current protection is provided by the power control module 100 by sensing the current flowing in the current path from the HVIN port to the VOUT port via the current sensor 118 and comparing the current sensor signal (which corresponds to the current flowing in the current path) provided by the current sensor 118 to the OC REF via comparator 124. When the current sensor signal exceeds the OC REF as indicated by the output of comparator 124, thereby indicating an OC condition, the control circuitry 102 is configured to turn off (i.e., set to an open state) each of isolation circuits 104 and 106. In one embodiment, the control circuitry 102 is configure to turn off only isolation circuit 106 in response to an OC indication from comparator 124. In the embodiment shown in FIG. 1, the current sensor 118 is situated in the current path between isolation circuit 106 and the VOUT port. However, it is noted that the current sensor 118 may be situated anywhere in the current path from the HVIN port to the VOUT port to sense current flow.

In the embodiment shown in FIG. 1, over-temperature protection is provided by the power control module 100 by using the temperature sensor 116. In one embodiment, the temperature sensor 116 comprises a P-N junction, which is situated sufficient close to isolation circuit 106 to receive thermal energy that is emitted from the isolation circuit. The temperature sense signal (which corresponds to a temperature of isolation circuit 106) is provided by temperature sensor 116 and compared with the OT REF by comparator 122, which provides its output to the control circuitry 102. In one embodiment, after receiving an OT indication via comparator 122 when the temperature sense signal exceeds the OT REF, the control circuitry 102 is configured to turn off both isolation circuits 104 and 106. In another embodiment, the control circuitry 102 is configure to turn off only isolation circuit 106 in response to an OT indication from comparator 122.

Figure 2:
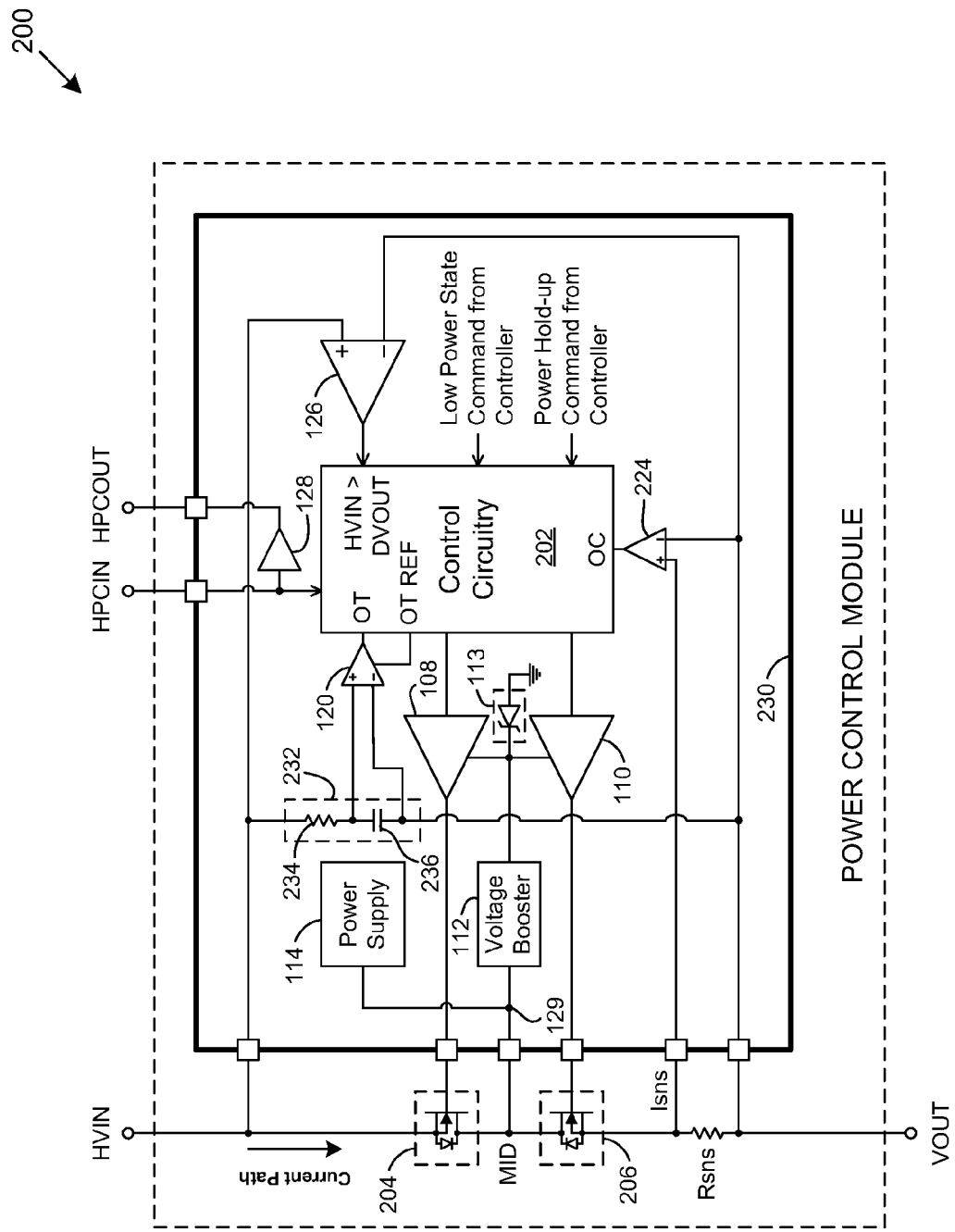
FIG. 2 shows a power control module for a data storage device according to an embodiment of the invention comprising two isolation circuits which are coupled between a host input voltage port and an output voltage port of the power control module, wherein the two isolation circuits are situated outside of an integrated circuit on which other components of the power control module reside.

FIG. 2 shows a power control module 200 according to an embodiment of the invention. To avoid duplicate description and preserve brevity, only the differences between power control module 200 in FIG. 2 and power control module 100 in FIG. 1 will be described herein. In power control module 200, all of the components shown within solid line 230 are situated on the same IC (e.g., a PLSI or ASIC), and isolation circuits 204 and 206 and a current sense resistor (Rsns) are situated external to the IC. In one embodiment, Rsns is also situated on the same IC as the components of power control module 200 shown within solid line 230 in FIG. 2, and the isolation circuits 204 and 206 are situated external to the IC. In the embodiment in FIG. 2, isolation circuits 204 and 206 each comprise a FET including an intrinsic body diode. In other embodiments, the isolation circuits 204 and 206 may each comprise, for example, a load switch or other type of semiconductor device or devices configured to operate as a switch.

As shown in FIG. 2, Rsns is coupled between isolation circuit 206 and the VOUT port and is used to sense the current in the current path that extends from the HVIN port to the VOUT port. In other embodiments, Rsns may be placed in a different location in the current path (e.g., between isolation circuits 204 and 206 or between the HVIN port and isolation circuit 204. As shown in the embodiment in FIG. 2, a first terminal of Rsns is coupled to isolation circuit 206 and a positive input of comparator 224, a second terminal of Rsns is coupled to the VOUT port and the negative input of comparator 224, and the output of comparator 224 is coupled to the OC (over-current) input of the control circuitry 202. In an embodiment, comparator 224 is configured to compare a current sense (Isns) signal from the first terminal of Rsns with a signal from the VOUT port and provide an indication of an OC condition to the control circuitry 202 when the voltage across Rsns (as determined by comparing the Isns signal with the signal from the VOUT port) exceeds a predetermined threshold. In an embodiment, comparator 224 includes a voltage offset for non-zero comparison. In another embodiment, the voltage offset is external to comparator 224.

In one embodiment, after receiving the indication of the OC condition via comparator 224, the control circuitry 202 is configured to turn off both isolation circuits 204 and 206 to provide OC protection to isolation circuits 204 and 206 as well as components of the data storage device that are coupled to (and receiving power from) the VOUT port. In another embodiment, the control circuitry 202 is configure to turn off only isolation circuit 206 in response to an indication of an OC condition from comparator 224 to provide OC protection.

In the embodiment shown in FIG. 2, power control module 200 does not include a temperature sensor. However, power control module 200 provides an over-temperature (OT) estimator which is created by coupling a differential input of filter 232 between the HVIN port and the VOUT port and coupling a differential output of filter 232 between positive and negative inputs of comparator 120. An over-temperature reference (OT REF) is coupled to a reference input of comparator 120, and the output of comparator 120 is coupled to the OT input of the control circuitry 202. In an embodiment, when the differential output of filter 232 exceeds the OT REF, the control circuitry 202 is configured to turn off isolation circuit 206, thereby protecting isolation circuits 204 and 206 from an OT condition by interrupting current flow in the current path that extends from the HVIN port to the VOUT port. In the embodiment shown in FIG. 2, filter 232 is a low pass filter and comprises resistor 234 and capacitor 236.

In an embodiment in which isolation circuits 204 and 206 each comprise a FET, the OT estimator protects the FETs from the OT condition by controlling the amount of time that the FETs are conducting when an over-voltage condition is present. Since the temperature rise of the FET is approximately equal to $I*V*R\theta_{j-a}*(1-e^{-\tau/\tau})$, wherein "$R\theta_{j-a}$" is the FET thermal resistance junction-to-ambient and "$\tau$" is the FET thermal time constant, "I" is the current flowing through each FET, and "V" is the voltage at the HVIN port minus the voltage at the VOUT port. If the time constant of filter 232 is set to be approximately equal to the FET thermal time constant, and assuming a worst case current, then an OV (over-voltage) limit can be set to be approximately equal to a worst case temperature rise. In one embodiment, the OT REF is generated by the control circuitry 202 and is inversely proportional to the current flowing in the current path that extends from the HVIN port to the VOUT port such that as the current increases, the OT REF decreases.

Figure 3:
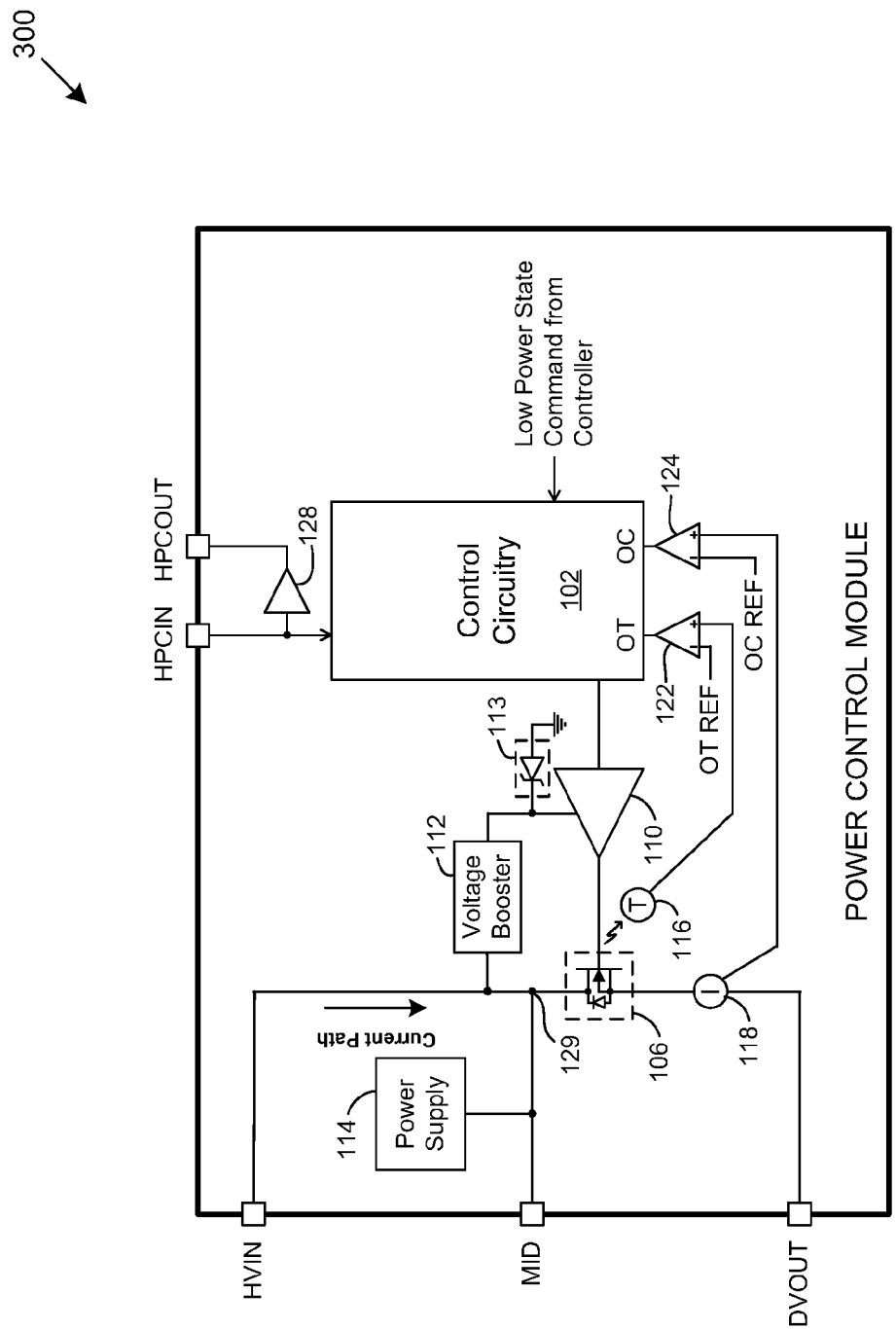
FIG. 3 shows a power control module for a data storage device according to an embodiment of the invention comprising one isolation circuit which is coupled between a host input voltage port and an output voltage port of the power control module.

FIG. 3 shows a power control module 300 according to an embodiment of the invention. A difference between power control module 300 in FIG. 3 and power control module 100 in FIG. 1 is that isolation circuit 104 and driver 108 are not used in power control module 300. By using only isolation circuit 106, isolation is not provided from the data storage device to the host power supply in the embodiment shown in FIG. 3. As a result, the hold-up mode that is used in power control modules 100 (shown in FIG. 1) and 200 (shown in FIG. 2) is not support in power control module 300. However, control module 300 does provide protection against one or more of over-voltage, over-current, and over-temperature conditions through the use of isolation circuit 106 in a similar manner as described above with respect to power control module 100.

Figure 4:
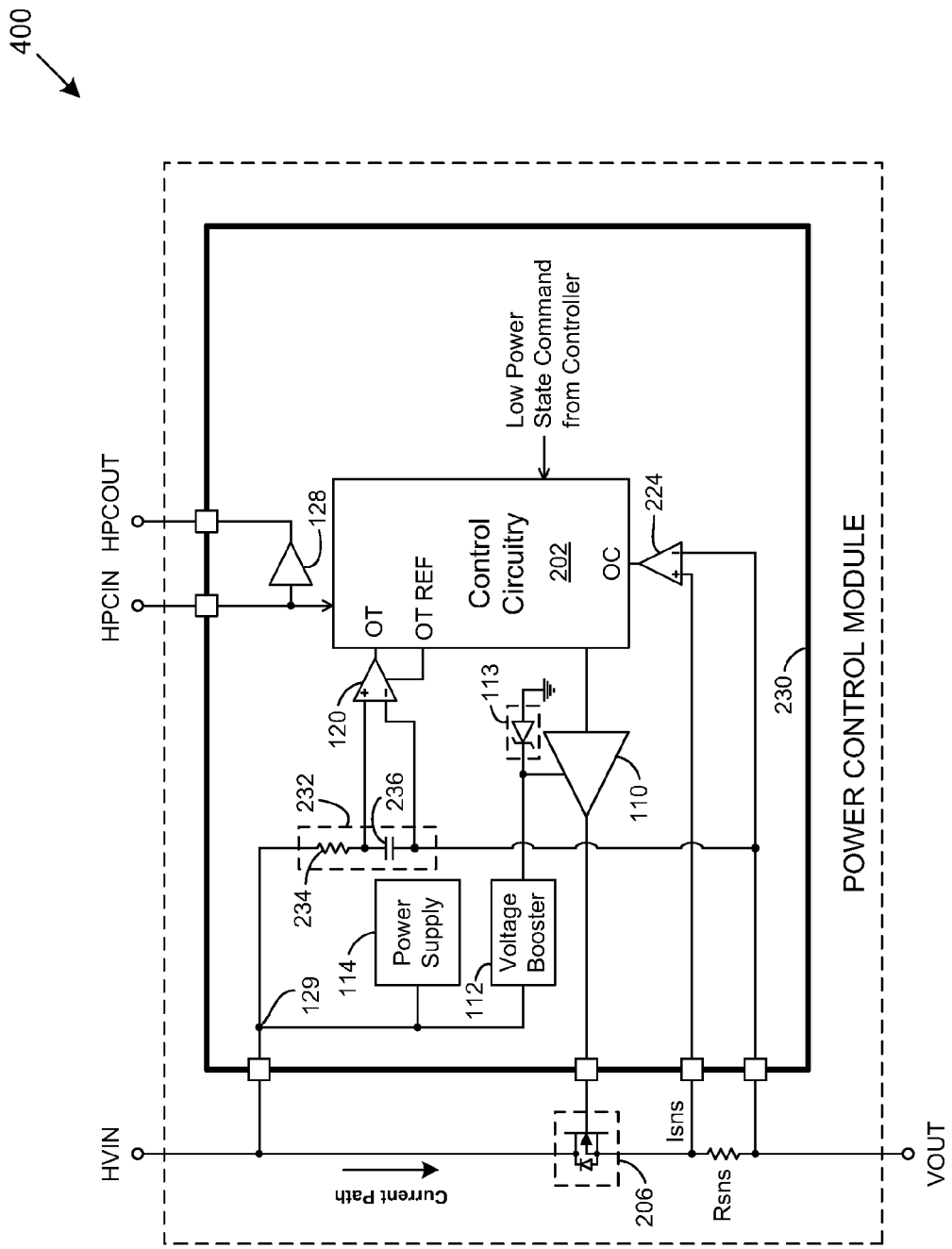
FIG. 4 shows a power control module for a data storage device according to an embodiment of the invention comprising one isolation circuit which is coupled between a host input voltage port and an output voltage port of the power control module, wherein the isolation circuit is situated outside of an integrated circuit on which other components of the power control module reside.

FIG. 4 shows a power control module 400 according to an embodiment of the invention. A difference between power control module 400 in FIG. 4 and power control module 200 in FIG. 2 is that isolation circuit 204 and driver 108 are not used in power control module 400. By using only isolation circuit 206, isolation is not provided from the data storage device to the host power supply. As a result, the hold-up mode that is used in power control modules 100 (shown in FIG. 1) and 200 (shown in FIG. 2) is not support in power control module 400. However, control module 400 does provide protection against one or more of over-voltage, over-current, and over-temperature conditions through the use of isolation circuit 206 in a similar manner as described above with respect to power control module 200.

Figure 5:
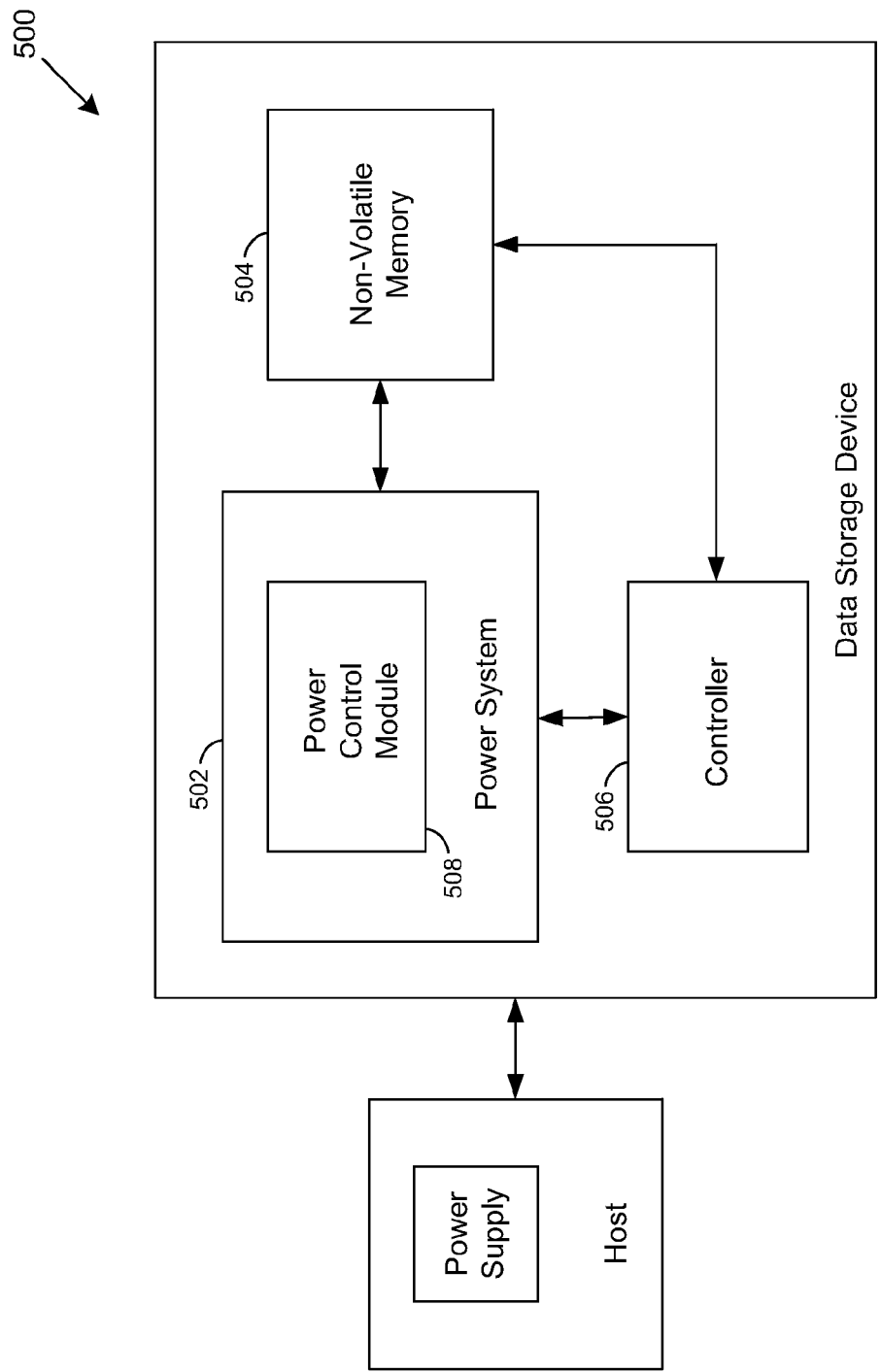
FIG. 5 shows a data storage device according to an embodiment of the invention comprising a power control module in communication with a controller via a power system and in communication with non-volatile memory via the power system.

FIG. 5 shows a data storage device 500 in communication with a host according to an embodiment of the invention. Data storage device 500 receives power from the power supply in the host and can be, for example, a solid state drive, a disk drive, or a hybrid drive (i.e. a data store device comprising both rotating magnetic media and non-volatile semiconductor memory (NVSM, e.g., flash memory). Data storage device 500 comprises a power system 502, non-volatile memory (NVM) 504 and a controller 506. The power system 502 comprises a power control module 508, which can be, for example, power control module 100, 200, 300, or 400 shown in FIGS. 1-4, respectively. In the embodiment shown in FIG. 5, the controller 506 is in communication with the power control module 508 via the power system 502 and also in communication with NVM 504, and the power control module 508 is in communication with NVM 504 via the power system 502.

In various embodiments, NVM 504 may comprise, for example, NVSM (e.g., flash memory) and/or rotating magnetic media. It is noted that data storage device 500 also includes other components known to one of ordinary skill in the art but not shown in FIG. 5 so as not to obscure the various described embodiments of the invention. In the embodiment shown in FIG. 5, the power control module 508 receives power from the host power supply and provides power to the controller 506, non-volatile memory 504, and other components of the data storage device 500 not shown in FIG. 5 via the power system 502.

While some embodiments of the invention have been described, these embodiments have been presented by way of example only, and are not intended to limit the scope of the disclosure. Indeed, the novel methods and devices described herein may be embodied in a variety of other forms. Furthermore, various omissions, substitutions and changes in the form of the methods and devices described herein may be made without departing from the spirit of the disclosure. For example, the various components described may be implemented as software and/or firmware on a processor, ASIC/FPGA, or dedicated hardware. As an additional example, some of the above described power module embodiments may be implemented in electronic devices other than data storage devices.

Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of protection is defined only by the claims.

What is claimed is:

1. A power control module comprising:
a first port for receiving a supply voltage from a power supply of a host;
a second port for providing an output voltage to power one or more components of a data storage device;
a first isolation circuit coupled to both the first and second ports;
a first driver comprising an output coupled to a control terminal of the first isolation circuit;
a voltage booster comprising an input for receiving the supply voltage from the first port and an output for providing a boost voltage to a supply terminal of the first driver;
a voltage limiter operable to limit the boost voltage to a limited boost voltage; and
control circuitry coupled to an input of the first driver and operable to cause the first isolation circuit to be in a closed state during a normal operating mode by causing the first driver to apply the limited boost voltage to the control terminal of the first isolation circuit, thereby enabling the first isolation circuit to provide over-voltage protection to the one or more components of the data storage device by limiting the output voltage at the second port to less than the limited boost voltage.

2. The power control module as recited in claim 1, further comprising a current sensor situated in a current path extending from the first port to the second port and providing a sensor signal corresponding to a current flowing in the current path, wherein the control circuitry is further operable to cause the first isolation circuit to be in an open state when the sensor signal exceeds an over-current reference.

3. The power control module as recited in claim 1, further comprising a sense resistor coupled between the first isolation circuit and the second port, wherein the control circuitry is further operable to cause the first isolation circuit to be in an open state when a voltage across the sense resistor indicates an over-current condition.

4. The power control module as recited in claim 1, further comprising a temperature sensor operable to provide a temperature sensor signal corresponding to a temperature of the first isolation circuit, wherein the control circuitry is further operable to cause the first isolation circuit to be in an open state when the temperature sensor signal exceeds an over-temperature reference.

5. The power control module as recited in claim 1, further comprising a low pass filter having a differential input coupled between the first port and the second port, wherein the control circuitry is further operable to cause the first isolation circuit to be in an open state when a differential output of the low pass filter exceeds an over-temperature reference.

6. The power control module as recited in claim 5, wherein the over-temperature reference is inversely proportional to a current flowing in a current path extending from the first port to the second port.

7. The power control module as recited in claim 1, further comprising a power supply having an input for receiving the supply voltage from the host at the first port and an output for providing power to the control circuitry, the voltage booster, and the first driver.

8. The power control module as recited in claim 7, wherein the first isolation circuit, the power supply, the first driver, and the control circuitry are situated on an integrated circuit.

9. The power control module as recited in claim 7, wherein the power supply, the first driver, and the control circuitry are situated on an integrated circuit and the first isolation circuit is situated external to the integrated circuit.

10. The power control module as recited in claim 1, wherein the one or more components of the data storage device comprise a controller, and wherein the control circuitry is further operable to cause the first isolation circuit to be in an open state in response to a command from the controller to enter a low power state requested by the host.

11. The power control module as recited in claim 10, further comprising a third port, wherein the control circuitry is further operable to cause the first isolation circuit to be in a closed state in response to a host power control signal received at the third port and indicating an end to the low power state.

12. The power control module as recited in claim 1, further comprising a second isolation circuit coupled between the first port and the first isolation circuit and a second driver having an output coupled to a control terminal of the second isolation circuit, an input coupled to the control circuitry, and a supply terminal coupled to the output of the voltage booster, wherein the control circuitry is further operable to cause the second isolation circuit to be in a closed state during the normal operating mode by causing the second driver to apply the limited boost voltage to the control terminal of the second isolation circuit.

13. The power control module as recited in claim 12, wherein the control circuitry is further operable to cause the second isolation circuit to be in an open state when the output voltage at the second port is greater than the supply voltage at the first port.

14. The power control module as recited in claim 12, further comprising a current sensor situated in a current path extending from the first port to the second port and providing a sensor signal corresponding to a current flowing in the current path, wherein the control circuitry is further operable to cause the first isolation circuit to be in an open state when the sensor signal exceeds an over-current reference.

15. The power control module as recited in claim 12, further comprising a sense resistor coupled between the first isolation circuit and the second port, wherein the control circuitry is further operable to cause the first isolation circuit to be in an open state when a voltage across the sense resistor indicates an over-current condition.

16. The power control module as recited in claim 12, further comprising a temperature sensor operable to provide a temperature sensor signal corresponding to a temperature of the first isolation circuit, wherein the control circuitry is further operable to cause the first isolation circuit to be in an open state when the temperature sensor signal exceeds an over-temperature reference.

17. The power control module as recited in claim 12, further comprising a low pass filter having a differential input coupled between the first port and the second port, wherein the control circuitry is further operable to cause the first isolation circuit to be in an open state when a differential output of the low pass filter exceeds an over-temperature reference.

18. The power control module as recited in claim 17, wherein the over-temperature reference is inversely proportional to a current flowing in a current path extending from the first port to the second port.

19. The power control module as recited in claim 12, further comprising a power supply having an input for receiving the supply voltage from the host at the first port via the second isolation circuit and an output for providing power to the control circuitry, the voltage booster, and the first and second drivers.

20. The power control module as recited in claim 19, wherein the first and second isolation circuits, the power supply, the first and second drivers, and the control circuitry are situated on an integrated circuit.

21. The power control module as recited in claim 19, wherein the power supply, the first and second drivers, and the control circuitry are situated on an integrated circuit and the first and second isolation circuits are situated external to the integrated circuit.

22. The power control module as recited in claim 12, wherein the one or more components of the data storage device comprise a controller, and wherein the control circuitry is further operable to cause the first isolation circuit to be in an open state in response to a command from the controller to enter a host-requested low power state.

23. The power control module as recited in claim 22, further comprising a third port, wherein the control circuitry is further operable to cause the first isolation circuit to be in a closed state in response to a host power control signal received at the third port and indicating an end to the host-requested low power state.

24. The power control module as recited in claim 12, wherein the one or more components of the data storage device comprise a controller, and wherein the control circuitry is further operable to cause the first isolation circuit to be in a closed state and the second isolation circuit to be in an open state in response to a hold-up command received from the controller, thereby isolating the host power supply from the power control module to enable a back-up supply voltage to be provided at the second port in response to a host supply voltage failure.

25. The power control module as recited in claim 1, wherein the first isolation circuit comprises a FET having a gate coupled to the output of the first driver and a source coupled to the second port, and wherein the first isolation circuit provides over-voltage protection to the one or more components of the data storage device by limiting the output voltage at the second port to the limited boost voltage minus the FET's gate-to-source voltage threshold.

26. The power control module as recited in claim 12, wherein the second isolation circuit comprises a FET having a gate coupled to the output of the second driver and a source coupled to the first port, and wherein when the second isolation circuit is in the closed state during the normal operating mode.

27. An integrated circuit comprising the power control module as recited in claim 7.

28. An integrated circuit comprising the power control module as recited in claim 19.

29. A data storage device comprising the power control module as recited in claim 1.

30. A power control module comprising:
  an isolation circuit coupled to a first port for receiving a supply voltage and a second port for providing an output voltage to power one or more components of a data storage device;
  a driver comprising a supply terminal and an output terminal coupled to a control terminal of the isolation circuit;
  a voltage booster for providing a boost voltage, based on the supply voltage, to the supply terminal of the driver;
  a voltage limiter operable to limit the boost voltage to a limited boost voltage; and
  control circuitry operable to cause the isolation circuit to be in a closed state during a normal operating mode by causing the driver to apply the limited boost voltage to the control terminal of the isolation circuit, thereby limiting the output voltage at the second port to less than the limited boost voltage.

31. A data storage device comprising:
  a controller;
  a power control module comprising:
    a first port for receiving a supply voltage from a power supply of a host;
    a second port for providing an output voltage to power the controller;

a first isolation circuit coupled to both the first and second ports;

a first driver comprising an output coupled to a control terminal of the first isolation circuit;

a voltage booster comprising an input for receiving the supply voltage from the first port and an output for providing a boost voltage to a supply terminal of the first driver;

a voltage limiter operable to limit the boost voltage to a limited boost voltage; and control circuitry coupled to an input of the first driver and operable to cause the first isolation circuit to be in a closed state during a normal operating mode by causing the first driver to apply the limited boost voltage to the control terminal of the first isolation circuit, thereby enabling the first isolation circuit to provide over-voltage protection to the controller by limiting the output voltage at the second port to less than the limited boost voltage.

32. The data storage device as recited in claim 31, wherein the power control module further comprises a current sensor situated in a current path extending from the first port to the second port and providing a sensor signal corresponding to a current flowing in the current path, and wherein the control circuitry is further operable to cause the first isolation circuit to be in an open state when the sensor signal exceeds an over-current reference.

33. The data storage device as recited in claim 31, wherein the power control module further comprises a sense resistor coupled between the first isolation circuit and the second port, and wherein the control circuitry is further operable to cause the first isolation circuit to be in an open state when a voltage across the sense resistor indicates an over-current condition.

34. The data storage device as recited in claim 31, wherein the power control module further comprises a temperature sensor operable to provide a temperature sensor signal corresponding to a temperature of the first isolation circuit, wherein the control circuitry is further operable to cause the first isolation circuit to be in an open state when the temperature sensor signal exceeds an over-temperature reference.

35. The data storage device as recited in claim 31, wherein the power control module further comprises a low pass filter having a differential input coupled between the first port and the second port, wherein the control circuitry is further operable to cause the first isolation circuit to be in an open state when a differential output of the low pass filter exceeds an over-temperature reference.

36. The data storage device as recited in claim 31, wherein the power control module further comprises a second isolation circuit coupled between the first port and the first isolation circuit and a second driver having an output coupled to a control terminal of the second isolation circuit, an input coupled to the control circuitry, and a supply terminal coupled to the output of the voltage booster, and wherein the control circuitry is further operable to cause the second isolation circuit to be in the closed state during the normal operating mode by causing the second driver to apply the limited boost voltage to the control terminal of the second isolation circuit.

\* \* \* \* \*